(12) United States Patent
Kienitz

(10) Patent No.: US 7,545,492 B2
(45) Date of Patent: Jun. 9, 2009

(54) SIGHTING DEVICE AND ADDITIONAL DEVICE FOR MEASURING, WORKING, AND/OR OPERATING WITH OR WITHOUT CONTACT

(75) Inventor: Ulrich Kienitz, Basdorf (DE)

(73) Assignee: Optris GmbH, Berlin (DE)

( * ) Notice: Subject to any disclaimer, the term of this patent is extended or adjusted under 35 U.S.C. 154(b) by 413 days.

(21) Appl. No.: 11/317,743

(22) Filed: Dec. 23, 2005

(65) Prior Publication Data

US 2006/0098710 A1 May 11, 2006

Related U.S. Application Data

(63) Continuation of application No. PCT/DE2004/001427, filed on Jul. 5, 2004.

(30) Foreign Application Priority Data

Jul. 30, 2003 (DE) ............... 103 30 237
Jul. 30, 2003 (DE) ............... 103 35 207

(51) Int. Cl.
*G01C 9/00* (2006.01)
(52) U.S. Cl. .................................... 356/247
(58) Field of Classification Search ............... 356/247, 356/43, 44; 378/206
See application file for complete search history.

(56) References Cited

U.S. PATENT DOCUMENTS

| | | | |
|---|---|---|---|
| 3,398,918 A * | 8/1968 | Girault | ............. 244/3.13 |
| 4,186,899 A | 2/1980 | Stewart, Jr. | |
| 4,218,138 A | 8/1980 | Robertsson | |
| 4,218,834 A | 8/1980 | Robertsson | |
| 4,227,261 A | 10/1980 | Robertsson | |
| 4,242,587 A * | 12/1980 | Lescrenier | ............... 378/20 |
| 4,293,771 A * | 10/1981 | Lescrenier | ............. 378/206 |
| 4,315,150 A * | 2/1982 | Darringer et al. | ...... 250/338.1 |
| 4,318,591 A | 3/1982 | Elterman | |
| 4,426,726 A * | 1/1984 | Cheetham | ............. 378/206 |
| 4,629,989 A * | 12/1986 | Riehl et al. | ............. 324/318 |
| 4,836,671 A * | 6/1989 | Bautista | ................ 356/3.1 |
| 4,986,654 A * | 1/1991 | Meijer et al. | ............... 356/43 |
| 6,234,669 B1 | 5/2001 | Kienitz et al. | |
| 6,459,760 B1 * | 10/2002 | D'Ambrosio | ............. 378/43 |

FOREIGN PATENT DOCUMENTS

| | | |
|---|---|---|
| DE | 196 54 276 A1 | 6/1998 |
| DE | 15 48 536 C1 | 5/2000 |
| FR | 1 466 437 A | 1/1967 |
| GB | 1 430 550 | 3/1976 |

* cited by examiner

*Primary Examiner*—Patrick J Connolly
(74) *Attorney, Agent, or Firm*—Alston & Bird LLP

(57) ABSTRACT

A sighting device is provided which is used to produce an optically perceptible target marking on an object. The sighting device includes one or more light sources for providing at least two sighting rays. A precision target marking is produced in such a manner that each of the sighting rays is directed onto a respective optical component enabling both of the sighting rays to be split on a respective illumination plane in such a manner that at least two illumination planes intersect at an angle. The point of intersection forms the target marking. A measuring, working and/or operating device is optionally provided which can be used with or without contact and which interacts with an object of any type at a predetermined target location. The target location can be detected by means of the inventive sighting device.

31 Claims, 10 Drawing Sheets a)

b)

c)

d)

SIGHTING DEVICE AND ADDITIONAL DEVICE FOR MEASURING, WORKING, AND/OR OPERATING WITH OR WITHOUT CONTACT

CROSS-REFERENCE TO RELATED APPLICATIONS

This application is a continuation of, and claims the benefit of priority to international PCT application number PCT/DE2004/001427, which was filed on Jul. 5, 2004, and which designates the United States. The disclosure of the referenced international PCT application is hereby incorporated herein by reference.

FIELD OF THE INVENTION

The invention relates to a sighting device for the generation of an optically perceptible target marking on an object with at least one light source to produce two sighting rays. Furthermore, the invention relates to a device with a measuring, working, and/or operating device which can be used with or without contact, where that device interacts with an object of any type at a predefined target location which can be fixed by means of the sighting device.

BACKGROUND OF THE INVENTION

Sighting devices and devices of the type coming into consideration here have been known in practice for a long time and find a broad range of uses, in particular in the scope of contact-free temperature measurement. Devices for contact-free temperature measurement include in general a detector for the detection of a thermal radiation radiating from a measured spot on a measured object, an optical system for imaging the thermal radiation radiating from a measured spot on the detector, and a sighting device for identifying the position of the measured spot on the measured object by means of visible light. In addition to this, devices are known in which in addition to the position of the measured spot the size of the measured spot on a measured object is also made visible.

In practice, laser rays are used predominantly to make a measured spot on a measured object visible. In so doing however, a series of problems arises. If the laser, for example, is disposed to the side of the optical axis of the radiation detector and the laser ray is coupled at a small angle to the optical axis of the detector, then the laser sighting ray and the optical axis of the detector form two skew straight lines which intersect at a certain distance from the detector. As a consequence a sighting device of this type provides an error-free target marking only at a certain fixed distance of the measured object from the detector while for all other distances there is a more or less large discrepancy between the generated target marking and the actual measured spot.

The optics used in infrared measurement devices, in infrared thermometers as well as in infrared cameras, are often not permeable in the visible range. In order to obtain a precise distance-independent center display by means of laser sighting, constructions are necessary which contain, in the central area of the infrared optics on the optical axis of the infrared detector, reversing mirrors or deflecting mirrors as well as optical windows. It is common to all the constructions that they are quite elaborate, where in this connection let reference be made to U.S. Pat. No. 4,315,150 merely by way of example.

Due to the special processing of the infrared-optical materials the introduction of central holes in the objective is relatively expensive. The structural elements for measurement center sighting reduce the effective aperture of the infrared measurement channel due to their size. In addition to this, due to their self-radiation they represent, in particular in the case of changes of temperature in the device or object, an interfering variable which is difficult to compensate in the optical channel. Furthermore, diffraction phenomena occurring at the edges related to construction cause a reduction of the geometric resolution.

BRIEF SUMMARY OF THE INVENTION

An objective of the present invention is to specify a sighting device, as well as a device with a measuring, working, and/or operating device which can be used with or without contact, of the type stated initially in which on the one hand a marking of the position and/or size of a measured spot is made possible with simple means and with high precision and in which on the other hand interfering influences on the axis of the measuring, working, and/or operating device are minimized.

According to at least one embodiment of invention, the above objective and other advantages with regard to a sighting device for the production of an optically perceptible target marking on an object by a sighting device are realized. According thereto a sighting device for producing an optically perceptible target marking on an object of the type stated initially is structured in such a manner that the two sighting rays are each directed onto an optical component by means of which the sighting rays can each be split in an illumination plane in such a manner that the two illumination planes intersect at an angle, where the point of intersection forms the target marking.

In a manner according to the invention it has first been recognized that components of a sighting device which are located on the axis of the measuring, working, and/or operating device have an interfering effect on the measurement process and even make a work process impossible under certain circumstances. Moreover, it has been recognized that through the splitting, according to the invention, of two sighting rays by means of optical components into two intersecting illumination planes a visible target marking in the form a of crosshairs can be generated. In so doing, the target marking, independently of the distance of the measured objects, is always located exactly on the axis of the measuring or operating device without any interfering components being disposed on the axis. Consequently, a parallax-free, distance-independent sighting is possible as a result.

In concrete terms the light source could be a laser which is divided to provide two sighting rays by means of a ray splitter into two unexpanded partial rays. Along with this, the laser could be structured in an advantageous manner as a battery-driven miniature laser with low output power which is not harmful to the human eye, for example, in the form of a diode laser or semiconductor laser. The output power of the laser could typically lie in the range of 1 mW, whereby it is ensured that the temperature of a measured spot is not influenced by the energy radiated onto the measured spot by the sighting device.

The two sighting devices thus produced are each directed onto one optical component, where each of the two optical components splits one of the two sighting rays into an illumination plane, that is, into a fan ray. To avoid unnecessary losses, i.e. for the generation of as bright as possible visible crosshairs, the optical components could be produced of a material with good transmission properties. In an advantageous manner materials such as glass, plexiglass, or transparent plastic could thus be used, which in addition has the advantage that the optical components can be produced extremely economically.

To split the sighting ray during its passage through the optical component it could comprise at least one, concave or convex, curved surface. In regard to easy handling and simple adjustment circular or semi-circular surfaces present themselves in particular, where elliptical or even asymmetrically curved surfaces would also be conceivable in principle. It is only important here that the sighting rays strike the optical component at different angles in such a manner that after passing through the optical component a splitting of the sighting ray is achieved.

So that the splitting of the sighting ray occurs in a plane, a cylindrical structure of the optical component, e.g. in the form a full cylinder, could be provided. The sighting rays then pass curved surfaces on entry into the optical component as well as on exit from the optical component, whereby an illumination plane is generated. However, structuring the optical component as a half cylinder is also conceivable so that the sighting ray only strikes one curved surface while it, depending on the orientation of the half cylinder, either on entry into the optical component or on exit from the optical component "sees" a smooth surface.

To fan out the sighting rays, diffractive optical elements, so-called holograms, and/or (micro)mechanical scanners could be used along with the refracting/deflecting components such as cylinders and prisms. In so doing, it is also conceivable that, to fan out, the sighting rays pass through several components which together form one functional unit.

In a preferred development, which distinguishes itself by a particularly simple handling and can be used repeatedly, the optical components are disposed on the outer wall of a cylindrical housing. Along with this, the cylindrical housing could, for example, serve to receive a ray detector as well as associated imaging optics.

Optical components implemented as a cylinder could be mounted on the outer wall of the housing in such a manner that it is tangential thereto. In so doing, the cylinder axis of the optical component could in addition to this be aligned so as to be orthogonal to the cylinder axis of the housing. This type of arrangement and alignment of the optical components on the housing can be realized with little effort in adjustment and provides, as is described further below in detail, in combination with a corresponding alignment of the sighting rays the desired target marking.

In a particularly preferred development, instead of a single laser which is split via a ray splitter into two sighting rays, two lasers could be provided so that each optical component is assigned its own laser.

The laser could also be disposed on the outer wall of the cylindrical housing and directed onto the optical components from the side turned away from the object to be investigated or processed. In so doing, the lasers could in particular be aligned so that the sighting rays are orthogonal to the cylinder axis of the optical components. In so doing, the lasers could be aligned so as to be either parallel to the axis of the housing or, if this should be necessary, for example, for structural reasons, on the optical components at an angle to the housing axis. In so doing, the distance of the lasers from the housing axis can in principle be chosen arbitrarily.

With respect to the precise positioning of the lasers along the outer circumferential surface of the housing it could be provided that the position of the lasers is consistent with the contact points of optical components on the outer wall of the housing. If the lasers in addition to this are aligned so as to be parallel to the axis of the housing, then it is ensured that the target marking resulting as the point of intersection of the two illumination planes always marks the central housing axis, and in fact independently of the distance of the object to be investigated or to be processed.

In an advantageous manner it could be provided that the optical components along the outer circumferential surface of the housing make an angle less than one hundred and eighty (180) degrees with one another. Were the two optical components namely positioned to be exactly opposite one another, then the two illumination planes resulting would have the same coverage and one would as a consequence obtain no crosshairs as the target marking. In practice an angle in the range of ninety (90) degrees has proven itself advantageous since the two illumination planes are then nearly perpendicular to one another and form clearly recognizable crosshairs as the target marking.

In the case that objects are supposed to be processed or investigated which can be only be sighted at an angle, the angle between the two optical components could be reduced accordingly so that the illumination planes appear on the object as aligned so as to be perpendicular to one another.

In regard to an especially elegant and high-performance development the sighting device could comprise a total of four lasers and correspondingly four sighting rays, where each sighting ray could be split as described above into an illumination plane, that is, into a fan ray. In sighting with more than two fan rays the possibility arises of compensating variations in ray density within an illumination plane. In practice the optical means for fanning out the laser sighting rays is as a rule namely provided in such a manner that the ray density of the generated fan ray is higher on one side than on the other side. If the means for fanning out are opposite one another in pairs, i.e. disposed with an offset of one hundred and eighty (180) degrees relative to one another, then the edge of low density of one fan ray is superimposed with the edge of higher ray density of the other fan ray, whereby altogether a homogeneous, rotationally symmetric illumination would be achieved. As a consequence, as high a ray density for the laser target marking in the measured spot as possible could be realized in this manner and thus good visibility realized. To generate crosshairs consisting of two illumination planes intersecting in the center of the measured spot and running perpendicular to one another, the optical means for fanning out the four sighting rays could each be disposed with an offset of ninety (90) degrees relative to one another.

In a specific form of embodiment which, as is described in detail further below, can be used particularly advantageously for the visualization of the size of the measured spot in connection with a temperature measurement device operating without contact, the width of the fan rays split into an illumination plane could have a lateral boundary. A width boundary of this type could, for example, be realized by a special structure of the ray expanding components or by including screens.

In regard to an apparatus of a measuring, working, and/or operating device which can be used with or without contact the above objective is realized by an apparatus according to one or more embodiments of the invention. According thereto a device of the type stated initially is characterized by a sighting device according to one or more of the claims.

The measuring device could, for example, be a pyrometer, a radiometer, or an infrared camera for contact-free temperature measurement. In a manner known per se this measurement device could comprise a detector onto which electromagnetic radiation emitted from a measured spot on an object is imaged by means of imaging optics. The detector could, for example, be used centered in the cylindrical housing of the sighting device. In the case of an arrangement of this type the target marking generated by components of the sighting device in the form of crosshairs is always located in the center of the measured spot and a parallax-free, distance-independent sighting is realized.

Along with the precise position of the center of the measured spot its distance-independent size representation is often of interest. The infrared thermometers which are the most common by far use optics with a focus point at a finite distance. In the case of these devices the measured spot diameter immediately in front of the device corresponds to the lens diameter. With increasing distance from the measuring device the measured spot diameter is reduced and is the smallest at the focus point. Beyond the focus point the measured spot diameter increases once again. To mark the measured spot diameter the skew ray technology disclosed in the Laid-open Specification DE 196 54 276 A1 has been used previously, in which technology the laser rays penetrate the illumination planes discussed here approximately obliquely. However, this technology requires a quite elaborate special realization for the representation of a central beam.

Alternatively to the known skew ray technology, the lateral boundary of the fan rays could be chosen in such a manner that the lateral edges of the fan rays can be used for the visualization of the measured spot diameter. For example, the lateral boundary could be set so that, seen from the detector up to the focus point, one edge of the fan ray marks the outer circumferential surface of the measured spot, and beyond the focus point, the other edge of the fan ray marks the outer circumferential surface of the measured spot. At the focus point the width of the fan ray then as a consequence agrees exactly with the measured spot diameter.

Instead of the measuring device a working or operating device could be provided which could, for example, be a drilling machine or a surgical instrument. In the case of drilling machines or similar devices there is in general the problem that the drilling process must be carried out in several individual steps. First, a target marking at the desired target location on the object must usually be generated by hand. Then the drill, in the idle state, is mounted on the target marking, and only thereafter is the drill driven and caused to rotate. When using the rotating drill, slipping of the drill from the target marking occurs frequently, which as a consequence has an imprecise and unclean processing as a result. In the case of a drilling machine with the sighting device according to the invention on the other hand, the drill can already have been set in rotation before the actual mounting of the drill on the object to be processed since the target marking, i.e. the intended point of mounting point of the drill on the object, is already visible. Through the visible target marking a rapid forward movement of the drill head even under conditions of rotation is simplified.

An additional utility in the scope of temperature measurement without contact is a real-time distance measurement between the measured object and the infrared system on its optical axis. Therein a so-called video sighter is used in which a laser generates a line in the scene. The position of the line can be determined by evaluation of the center column of the video image of the camera of the video sighter. The video camera works for blanking the line image from the usable image in pulsed mode. Alternatively, the position of the line can be determined by means of additional position-sensitive flat diodes, for example, a PSD (position-sensitive detector). The position of the line is used to determine the distance between the measured object and infrared system. This distance information provides in connection with a resolution setting position in the IR measuring system, which is explained further below, the necessary preliminary information in order to blend IR measured spot position and size into the video image automatically and correctly. On the video image of the scene a synthetic image is superimposed which is displayed on a separate monitor or on a screen on the measuring device.

BRIEF DESCRIPTION OF THE DRAWINGS

There are different possibilities of developing and extending the teaching of the present invention in an advantageous manner. In this connection reference is to be made, on the one hand, to the claims herein and, on the other hand, to the following descriptions of exemplary embodiments of the invention, which descriptions are to be understood in conjunction with the aid of the drawings. In connection with the descriptions of the exemplary embodiments, extensions of the teaching are also explained in general. According to the drawings:

DETAILED DESCRIPTIONS OF EMBODIMENTS OF THE INVENTION

Figure 1:
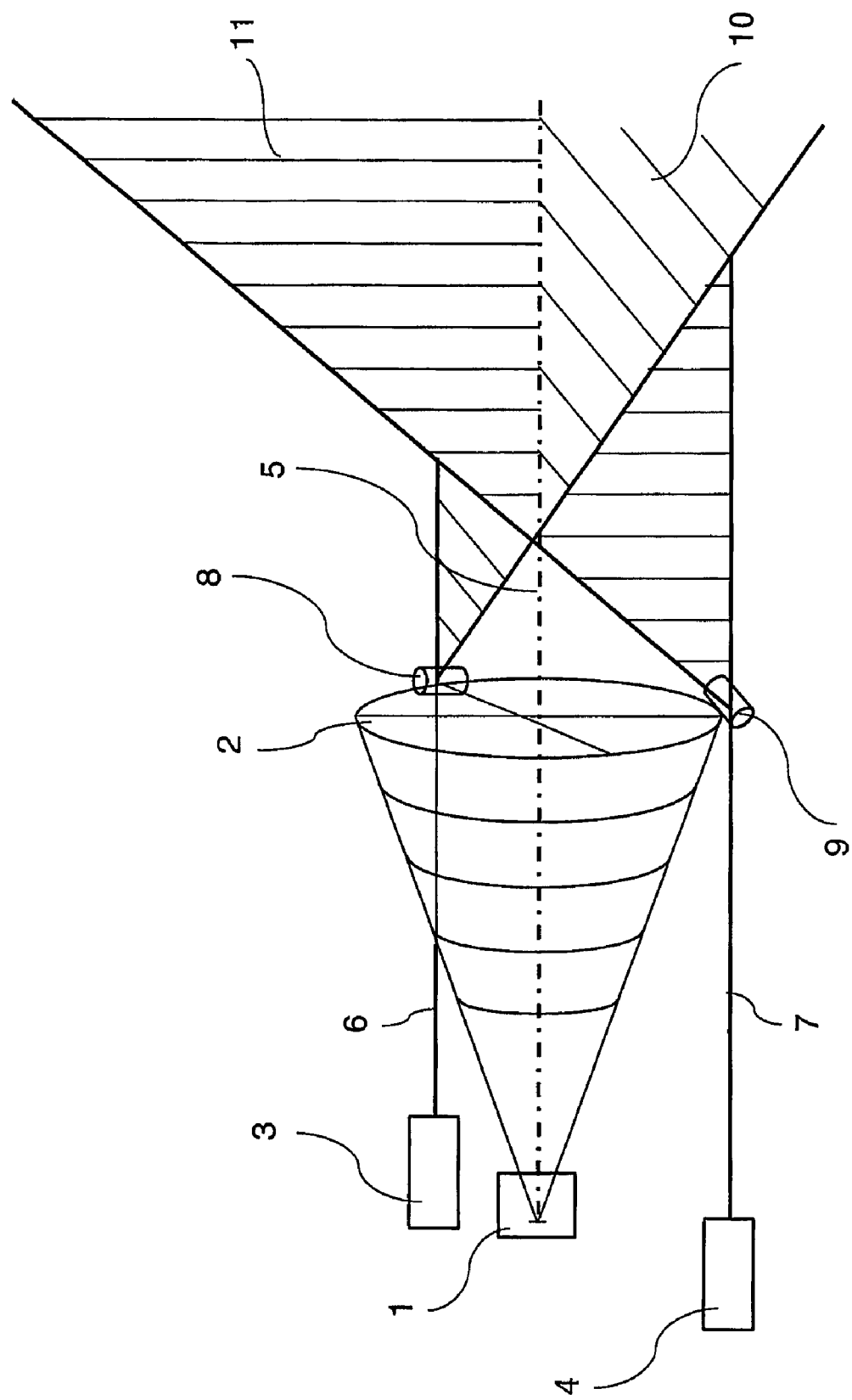
FIG. 1 is a schematic side view of a first embodiment of a device according to the invention.

FIG. 1 shows in a schematic side view a first embodiment example of a device according to the invention with a measuring device which can be used without contact and works interactively with an object of any type at a predetermined target location, where the target location's position can be fixed by means of a sighting device. The device comprises a detector 1 on which the electromagnetic radiation originating from a measured spot on an object not represented can be imaged by means of a lens 2.

The sighting device includes two lasers 3, 4 which are disposed to the side of the optical axis 5 of the detector 1. The lasers 3, 4 generate two sighting rays 6, 7 which run parallel to the optical axis 5 of the detector 1 and strike two optical components 8, 9 disposed on the outer circumferential surface of the lens 2. The first laser 3 and the associated optical component 8 are located, according to the perspective representation in FIG. 1, behind the optical axis 5 while the second laser 4 and the associated optical component 9 are disposed below the optical axis 5. Relative to the optical axis 5 the two lasers 3, 4, and accordingly the two optical components 8, 9, are at an angle of ninety (90) degrees with respect to one another.

Through the rear optical component 8 the sighting ray 6 of the first laser 3 is split into an illumination plane 10 oriented so as to be perpendicular to the image plane. The sighting ray 7 of the second laser 4 is on the contrary split by the lower optical component 9 into an illumination plane 11 oriented perpendicular to the illumination plane 10, that is, parallel to the image plane. Altogether, from the splitting of the two sighting rays 6, 7 two illumination planes 9 and 10, aligned so as to be orthogonal to one another result, whose intersection marks the optical axis 5 of the detector 1 in the form of crosshairs, independently of the distance from the detector 1.

Figure 2:
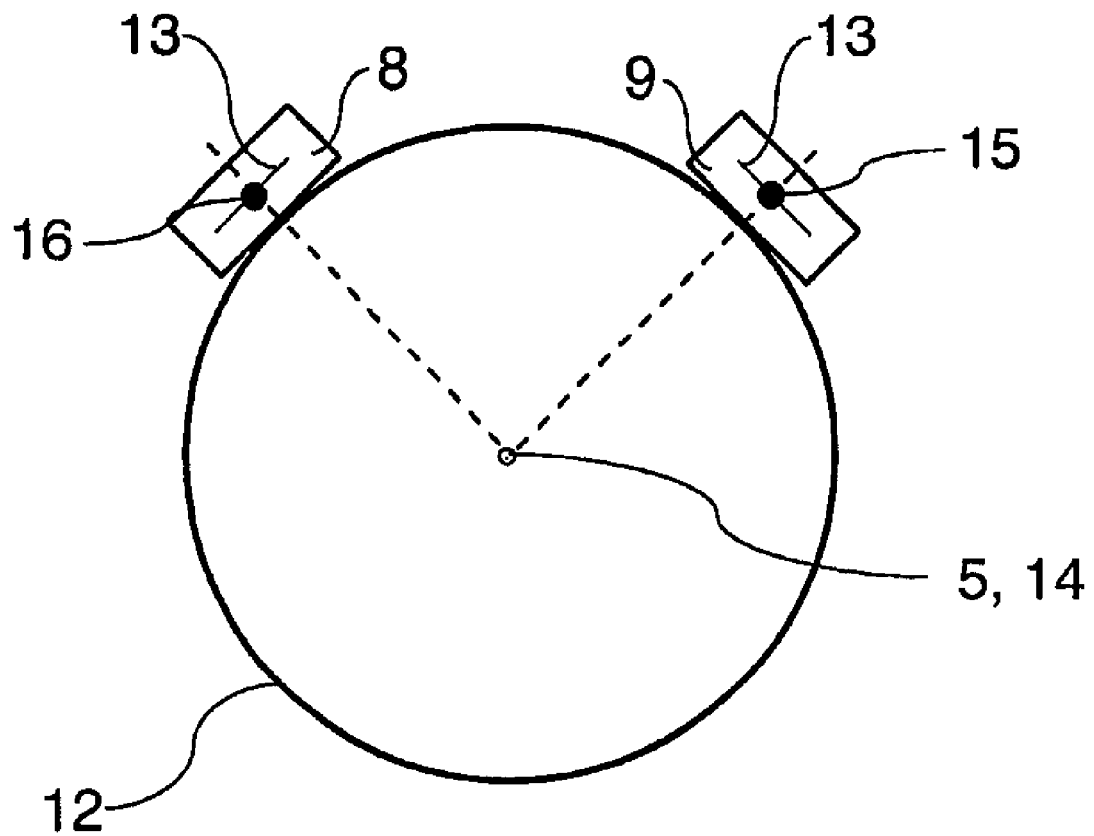
FIG. 2 is a schematic plan view an embodiment of a sighting device according to the invention for generating an optically perceptible target marking on an object.

FIG. 2 shows in a schematic plan view an embodiment example of a sighting device according to the invention. The sighting device includes, disposed so as to be concentric with the optical axis 5, a housing 12 on which the two lasers, not represented, as well as the two optical components 8, 9 are disposed. The two optical components 8, 9 are formed as full cylinders and lie so as to be tangential to the outer wall of the housing 12. Along with this, the cylinder axis 13 of the optical components 8, 9 is aligned so as to be orthogonal to the axis 14 of the housing 12. The two lasers are aligned so as to be parallel to the housing axis 14 in such a manner that the points of incidence 15, 16 of the sighting rays 6, 7 on the optical components 8, 9 lie on a straight lines represented in FIG. 2 as dotted lines, which are formed by a point on the housing axis 14 and the contact point of the optical components 8, 9 on the outer wall of housing 12.

Figure 3:
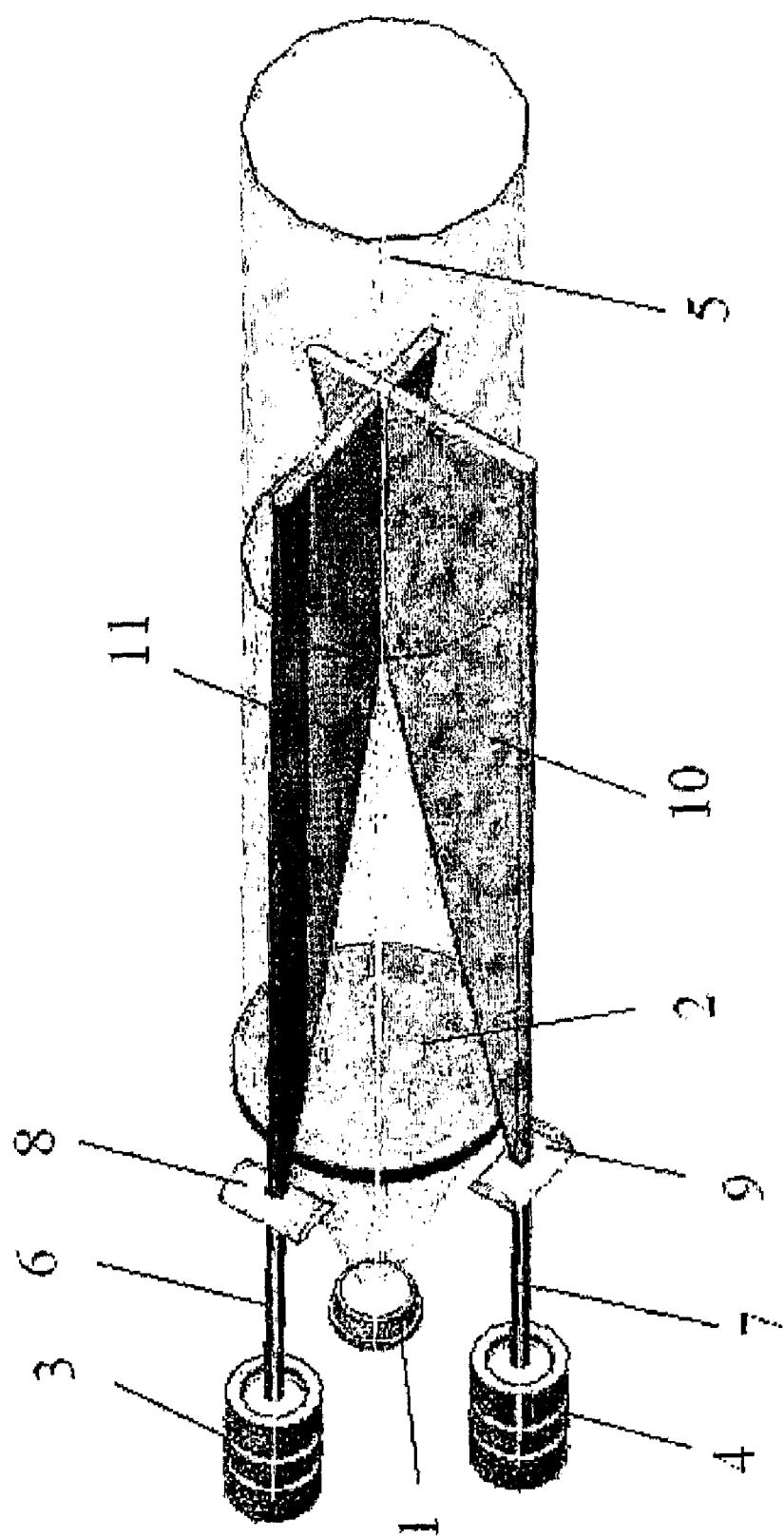
FIG. 3 is a perspective view similar to the device from FIG. 1 but with other means for the fanning out of the rays.

As FIG. 3 indicates, the width of the illuminated line can be limited by a special structure of the ray-expanding elements, in particular by the inclusion of screens not represented. In an embodiment of the invention according to FIG. 3, the detector 1 sits at the focal point of the lens 2, whereby optics imaging at infinity, i.e. with a constant size of the measured spot results independently of the distance. Therein, the screens, and thus the ray boundary, are chosen so that the outer edges of the laterally bounded fan rays 10, 11 run along the outer circumference of the measured spot and thus mark the size of the measured spot independently of the distance.

Figure 4:
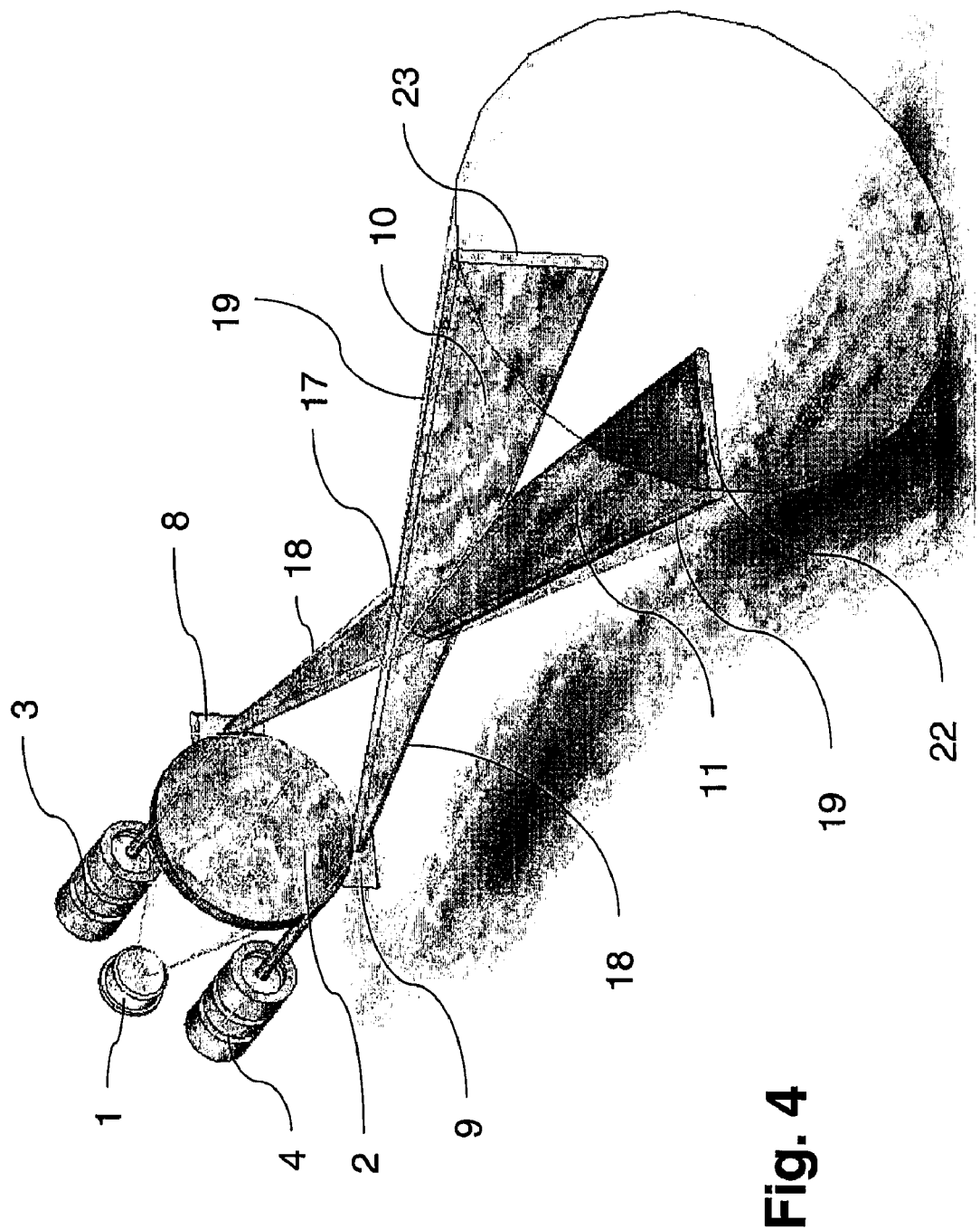
FIG. 4 is a perspective view schematically showing the device from FIG. 3 with imaging optics imaging at a finite distance.

FIG. 4 shows in a perspective view a device for contact-free temperature measurement with imaging optics 2 imaging at a finite distance, that is, with a focus point 17 at a finite distance, as is very widespread in practice. While the size of the measured spot directly in front of the device corresponds to the lens diameter, the size of the measured spot thereafter is increasingly narrowed with increasing distance until the focus point 17 of the arrangement is reached at the position of the greatest narrowing with the smallest measured spot diameter. Beyond the focus point 17 the measured spot diameter increases once again. FIG. 4 shows the detector 1 with lens 2 and the diameter represented by the narrowed, tubular diameter of the measured object at different distances. By limiting the fan rays 10, 11 to the diameter of the measured spot at the focus point 17 a target cross representation corresponding to FIG. 4 can be achieved. Stated more precisely, the fan rays 10, 11 run though the smallest measured spot diameter with a width which corresponds to the diameter. Before the focus point 17 is reached, one edge 18 of each fan ray 10, 11 limits the measured spot, beyond the focus point 17 the other edge 19 of each fan ray 10, 11 limits the measured spot. In the area of the focus point a cross is represented whose dimension and position approximately represent the diameter and center of the measured spot.

Figure 5:
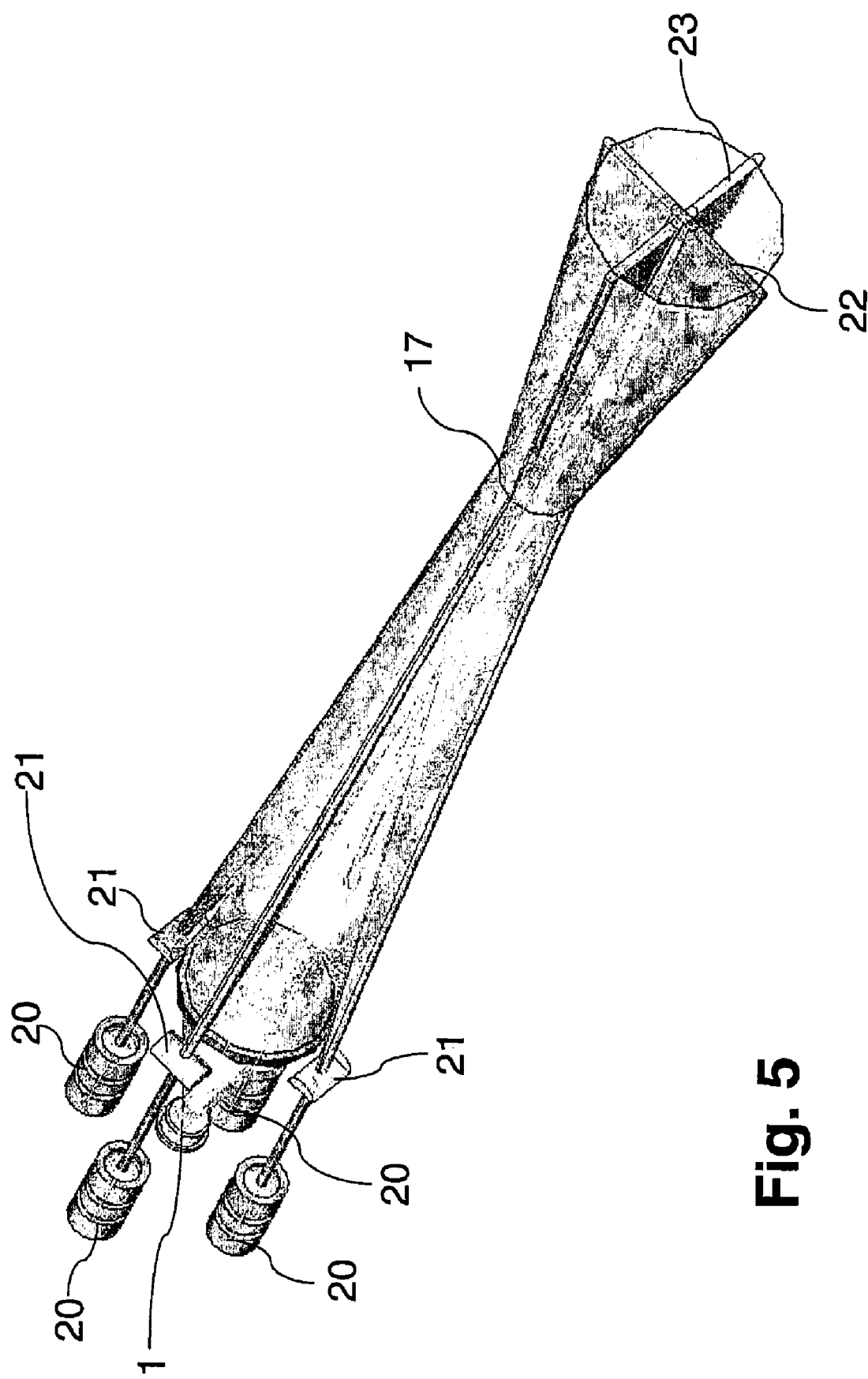
FIG. 5 is a perspective view schematically showing a second embodiment of a sighting device according to the invention with a total of four light sources.

FIG. 5 shows the extension of the principle by two additional fan ray arrangements so that the sighting device comprises in all four lasers 20 as well as four components 21 for the fanning out of the rays. Therein each two fan ray arrangements lie as a pair opposite one another. These arrangements generate fan rays which overlap in the area of the smallest measured spot completely with the fan rays generated on the respective opposite side. Behind the focus point 17 the respective outer edges of the fan rays mark the size of the measured spot. With that, an arrangement results in which the outer boundary of the measuring cross consisting of four lines represents the size of the measured spot exactly and at any distance. In the vicinity of the focus point 17 the measuring cross is represented by two penetrating illumination lines 22, 23 standing in an orthogonal relation to one another.

The optical means 21 are structured so that the ray density along an illumination line 22, 23 is smaller on one side than on the other. By this measure one achieves as high as possible a ray density of the laser target marking in the measured spot and thus good visibility. The lacking symmetry of the target cross representation is compensated by the disposition of two laser illumination arrangements according to FIG. 5, each offset by one hundred and eighty (180) degrees, since then the edge of lower ray density of one fan ray overlaps with the edge of higher ray density of the other fan ray. In this manner the marking of the center can be done in a manner which is rotationally symmetric and with increased brightness in the center area.

Figure 6:
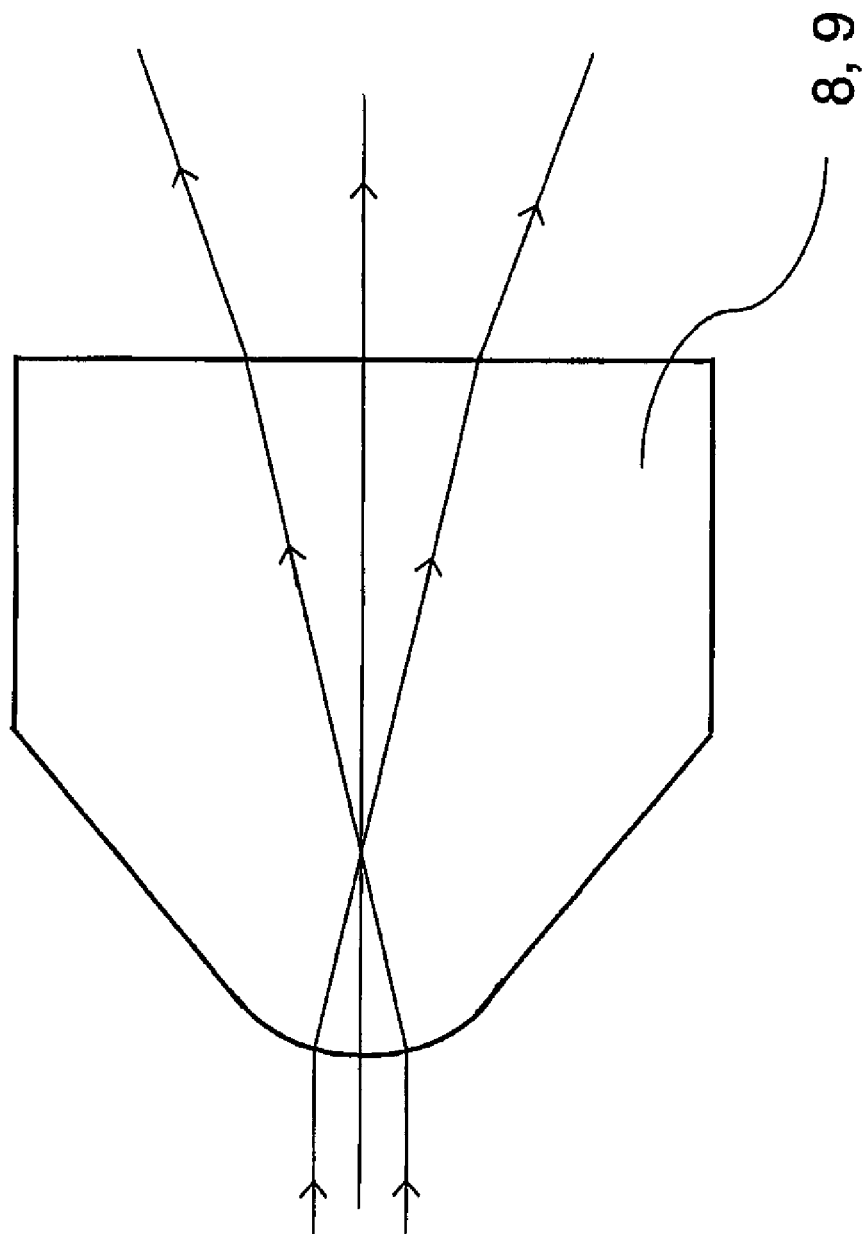
FIG. 6 is a schematic side view of a first embodiment of an optical component for the fanning out of sighting rays.

FIG. 6 shows an embodiment of an optical component 21 for fanning out of the rays of a laser sighting device. On the ray entry side the component 21 is structured in the sense of an axicon with a wedge-shaped, rounded tip. As a consequence the ray is incident on the component 21 at a plurality of different angles, whereby the ray path shown results. On exit from the component 21, that is, with a transition into the optically thinner medium, the fanned-out rays arrive at a plane boundary surface, which leads to an additional enlargement of the ray-opening angle. On the ray exit side, screens for the lateral boundary of the fan ray can be mounted according to the special requirements.

Figure 7:
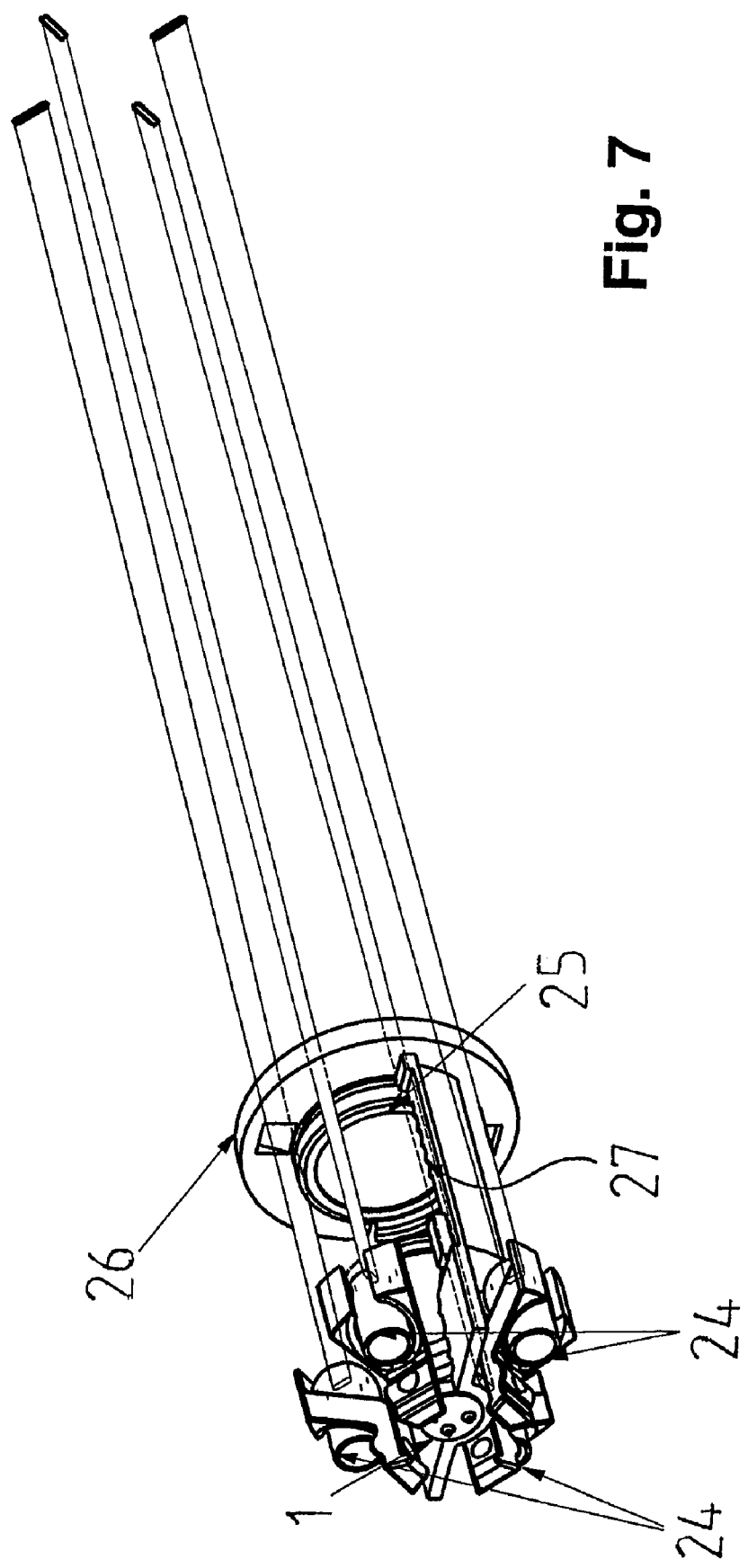
FIG. 7 is a perspective view schematically showing an another embodiment of a sighting device according to the invention with a total of four laser modules.

FIG. 7 shows in perspective view an additional embodiment example with a total of four fan rays. The difference relative to the embodiment to FIG. 5 consists of the fact that the four lasers are implemented as laser modules 24. The laser modules 24 are encapsulated in a cylindrical housing and comprise, along with the actual lasers, optics, which consists of a laser line generator and a collimator lens disposed in front of the laser modules, to fan out the rays so that the laser rays exit the housing already fanned out.

The IR objective 25 with which the IR radiation is imaged on the IR detector 1 is composed of two lenses. The lens turned away from the detector is held in such a manner that it is fixed in a window ring 26. The window ring 26 comprises a total of four passages so that the fan rays can pass the window ring 26 unhindered. The lens of the IR objective 25, specifically the lens facing the detector 1, can be displaced by means of a positioning mechanism 27 along the optical axis. In other words the IR objective 25 is imaged in the sense of a vario objective.

Figure 8:
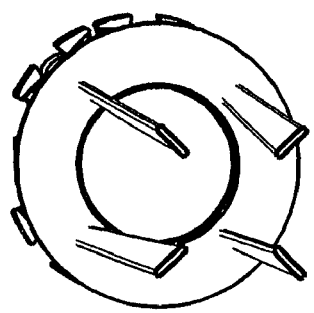
FIG. 8 is a perspective view schematically showing the propagation of fan rays in a device according to FIG. 7.
Figure 8:
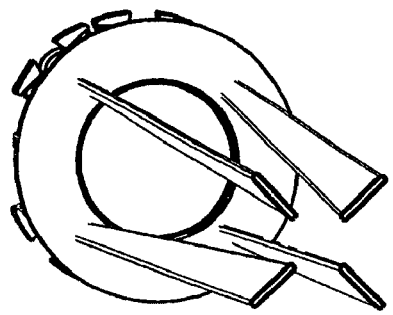
Figure 8:
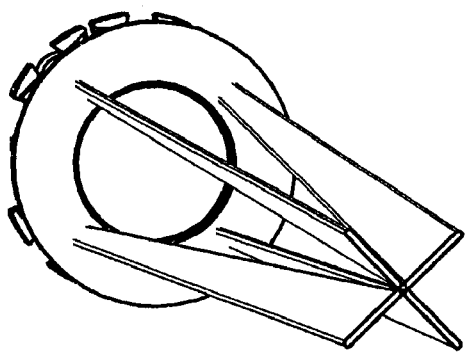
Figure 8:
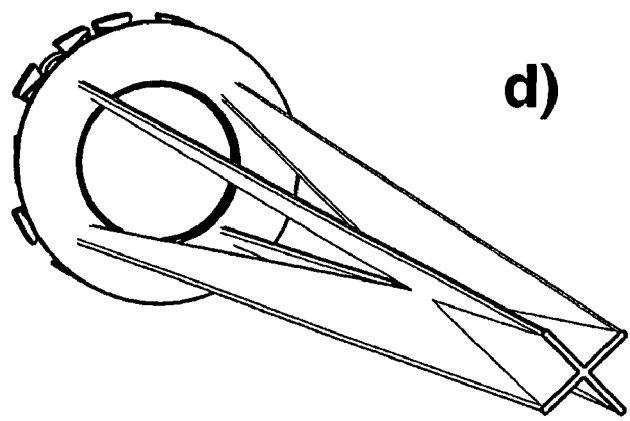
Figure 8:
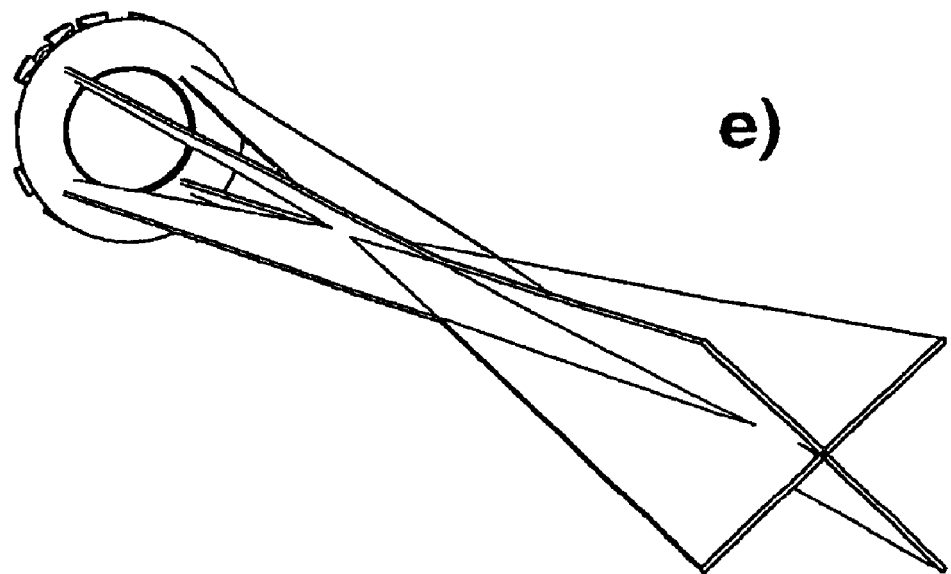
Figure 8:
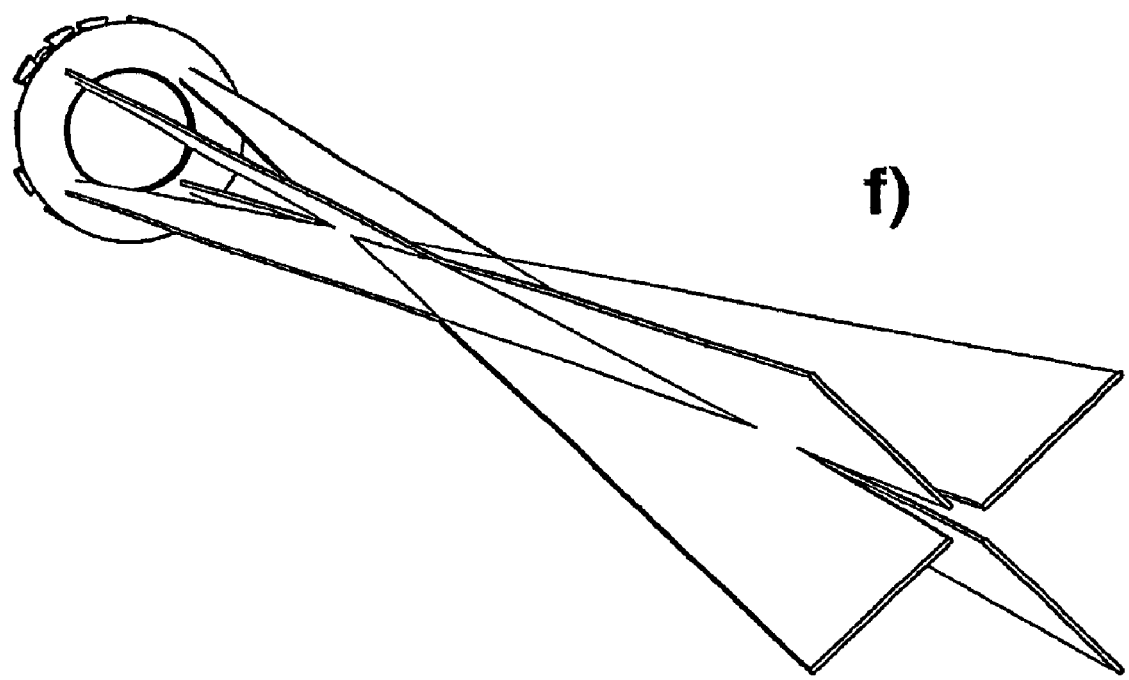

Finally, FIG. 8 shows the spatial propagation of the four fan rays behind the window ring 26. In FIG. 8*c*) the situation is represented in which the inner edges of the fan rays touch one another and thus form a closed cross. FIG. 8*d*) shows the situation at the focus point, that is, at the position of the greatest narrowing with the smallest diameter. Up to this point the size of the measured spot is limited by the outer edges of the fan rays. Behind the focus point, represented in FIGS. 8*e*) and *f*), the diameter of the measured spot is increased once again and limited by the inner edges of the fan rays.

Figure 9:
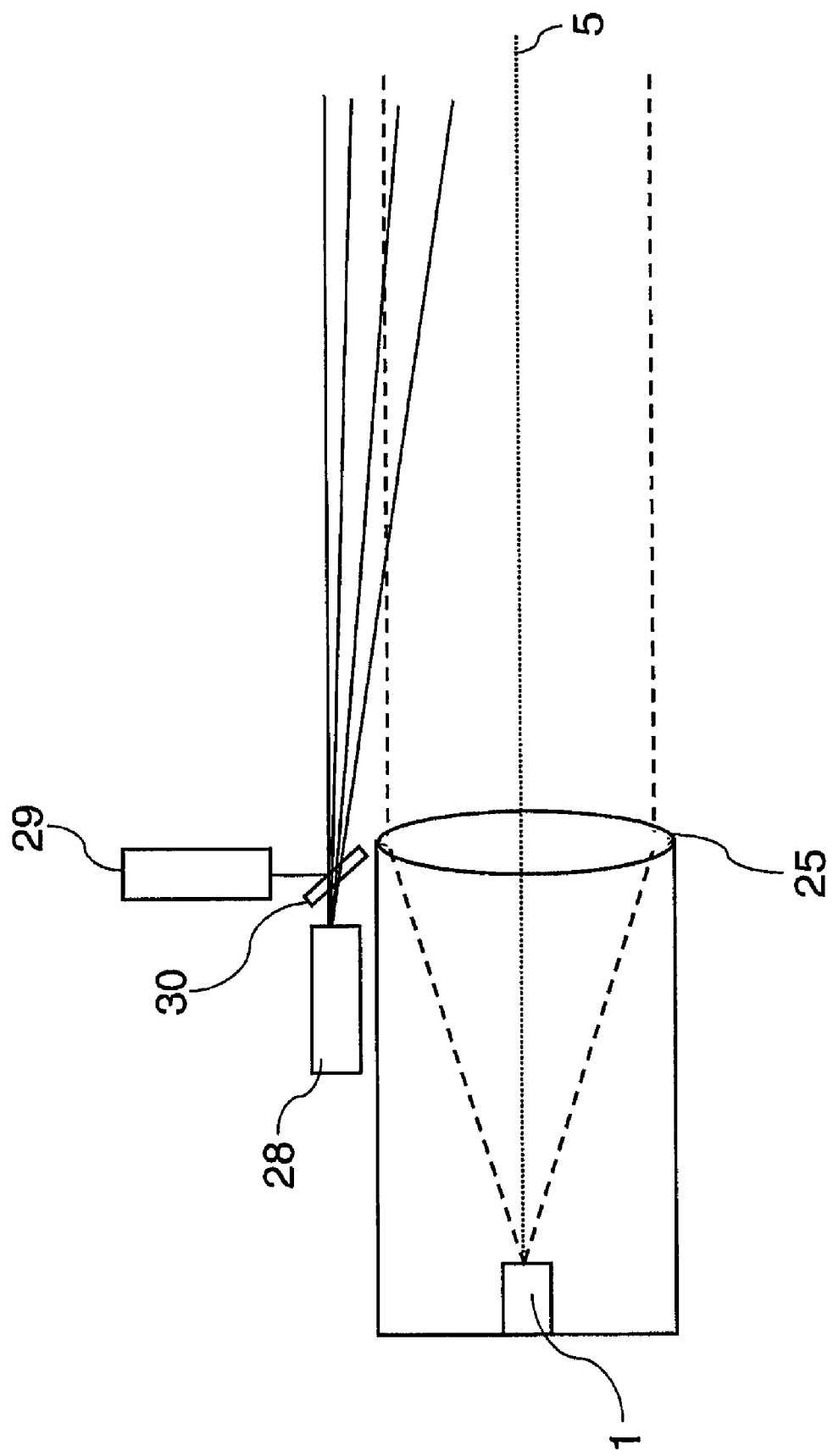
FIG. 9 is a schematic side view of another embodiment of a sighting device with two laser modules.

FIG. 9 shows schematically an embodiment example of an IR thermometer for contact-free temperature measurement with a sighting device with a total of two laser modules 28, 29. The course of the ray of the IR radiation is represented as a dotted line. The IR radiation is focused by the IR objective 25, which is represented as a single lens for simplicity's sake, on the IR detector 1. As has already been mentioned the sighting device comprises two laser modules 28, 29. The first laser module 28 generates, by means of a laser line generator integrated into the module 28, a fan ray whose splitting plane agrees with the plane of the drawing and includes the optical axis 5, represented as a dotted line, of the IR thermometer. The second laser module 29 generates, with the aid of the corresponding laser line generator, a fan ray perpendicular thereto, that is, perpendicular to the plane of the drawing. The two fan rays are superimposed in the illustrated embodiment example by means of a ray splitter 30, where in principle the use of a prism is also conceivable.

The second laser module 29 or the ray splitter 30 are aligned in such a manner that the generated fan ray only intersects the optical axis 5 of the IR thermometer at a quite specific distance from the detector 1. In other words the sighting device has in one plane a certain parallax error. Also, the representation of the size of the measured spot is only precise at a distance. These disadvantages are however compensated for by the fact that the device is, for one thing, extremely advantageous from the standpoint of manufacturing technology. For another thing the user-friendliness is improved to the effect that due to the immediate superimposition of the two fan rays over a wide range of distances the complete sighting cross is visible. Therewith the embodiment is distinguished quite significantly from the ray path represented in FIG. 8 in detail, in which the fan rays merely form a complete sighting cross for a relatively sharply limited area in front of and behind the focus point. Let it be noted that, instead of an embodiment by means of ray splitter 30 or prisms, it is also possible to position the two laser modules 28, 29 close to one another and to slightly tilt the second laser module 29 with respect to the optical axis 5 of the IR thermometer so that its fan ray intersects the optical axis 5 only at one point.

With regard to additional advantageous developments and extensions of the teaching according to the invention, reference is made on the one hand to the general part of the description and on the other hand to the accompanying claims.

In conclusion let it be emphasized in particular that the previously purely arbitrarily chosen embodiment examples merely serve to explain the teaching according to the invention but do not restrict it to those embodiment examples.

That which is claimed:

1. An apparatus comprising:
   a sighting device for the production of an optically perceptible target marking on an object, said sighting device comprising:
      one or more light sources for providing at least two sighting rays; and
      at least two optical components that each split a respective one of said sighting rays into a respective illumination plane such that at least two illumination planes are provided;
   wherein the at least two illumination planes intersect at an angle and form a target marking; and
   a measuring device, which interacts with an object of any type at a predefined target location which is set by means of the sighting device, and wherein said measuring device is used with or without contacting the object;
   wherein said measuring device comprises a detector onto which electromagnetic radiation emitted from a measured spot on the object is imaged by means of imaging optics; and
   wherein each of said optical components splits a respective sighting ray into a respective fan ray having a lateral edge, wherein the lateral edges are configured such that the fan rays visualize said measured spot diameter.

2. An apparatus according to claim 1, wherein each of said one or more light sources comprises a respective laser.

3. An apparatus according to claim 1, wherein at least one of said optical components comprises a cylindrical portion that defines a first cylinder axis, and wherein at least one of said one or more light sources comprises a laser that is aligned so as to be orthogonal to the first cylinder axis.

4. An apparatus according to claim 1, wherein at least one of said optical components comprises at least one transparent material selected from a group of materials, the group consisting of glass, poly(methyl methacrylate) (PMMA), poly (methyl 2-methylpropenoate), and transparent plastic.

5. An apparatus according to claim 1, wherein each of said one or more light sources comprises a respective laser such that at least two lasers are provided, and wherein each of said optical components is assigned a respective one of the lasers.

6. An apparatus according to claim 1, wherein two of said optical components are disposed at an angle of less than one hundred and eighty degrees relative to one another.

7. An apparatus according to claim 1, wherein at least one of said optical components comprises a diffractive optical element.

8. An apparatus according to claim 1, wherein at least one of said optical components comprises an electro-optical element or a micro-mechanical scanner.

9. An apparatus according to claim 1, wherein at least one of said optical components comprises a plurality of components which together form one functional unit.

10. An apparatus according to claim 1, further comprising a cylindrical housing having an outer wall, wherein at least one of said optical components is disposed on the outer wall of said cylindrical housing.

11. An apparatus according to claim 10, wherein the at least one of said optical components that is disposed on the outer wall lies on the outer wall and is tangential to the outer wall.

12. An apparatus according to claim 10, wherein the at least one of said optical components that is disposed on the outer wall comprises a cylindrical portion that defines a first cylinder axis, wherein said cylindrical housing defines a second cylinder axis, and wherein the first cylinder axis is disposed orthogonal to the second cylinder axis.

13. An apparatus according to claim 10, wherein a laser is located on the outer wall of a cylindrical housing and is disposed on a side of the optical component specifically that side turned away from the object.

14. An apparatus according to claim 10, wherein said cylindrical housing defines a cylinder axis, and wherein at least one of said light sources comprises a laser that is aligned parallel to the cylinder axis of the cylindrical housing.

15. An apparatus according to claim 10, wherein the point of incidence of the lighting ray on the optical component lies on a straight line formed by a point on the central axis of the housing and the contact point of the optical component on the outer wall of housing.

16. An apparatus according to claim 1, wherein at least one of said optical components comprises a portion having a curved circular surface or a curved elliptical surface such that the portion is capable of producing optical refraction.

17. An apparatus according to claim 16, wherein the portion is configured as a full cylinder.

18. An apparatus according to claim 16, wherein the portion is configured as a half cylinder.

19. An apparatus according to claim 1, wherein two of said optical components are disposed relative to each other at an angle of approximately ninety degrees.

20. An apparatus according to claim 1, wherein a total of four of said optical components are provided.

21. An apparatus according to claim 20, wherein said the four of said optical components are disposed in pairs opposite one another.

22. An apparatus according to claim 20, wherein adjacent said optical components are disposed relative to each other at an angle of approximately ninety degrees.

23. An apparatus according to claim 1, wherein each of said optical components splits a respective sighting ray into a respective fan ray that defines the respective illumination plane, wherein each fan ray has a lateral boundary.

24. An apparatus according to claim 1, wherein the measuring device comprises a pyrometer, a radiometer, or an infrared camera for contact-free temperature measurement.

25. An apparatus according to claim 1, further comprising a cylindrical housing, wherein the detector is centrally disposed in the cylindrical housing.

26. An apparatus according to claim 1, further comprising imaging optics defining a focus point at a finite distance, wherein each said optical component splits a respective sighting ray into a respective fan ray, wherein as seen from the detector up to the focus point one edge of a fan ray marks an outer circumferential surface of a measured spot, and wherein beyond the focus point another edge of the fan ray marks an outer circumferential surface of a measured spot.

27. An apparatus according to claim 1, wherein at least one of said light sources comprises a laser module, wherein the laser module comprises a laser encapsulated in a cylindrical housing and optics disposed in a path of the laser.

28. An apparatus according to claim 27, wherein the optics disposed in the path of the laser comprise a laser line generator and a collimator lens.

29. An apparatus according to claim 28, wherein at least two of said light sources are provided, wherein each of the at least two provided light sources comprises a respective laser module such that at least two laser modules positioned close to one another are provided, wherein each of the two provided laser modules comprises a respective laser line generator that generates a respective fan ray such that at least two fan rays which are at least approximately orthogonal to one another are generated.

30. An apparatus according to claim 29, wherein one of the at least two fan rays is aligned such that it intersects an optical axis defined by said sighting device and the other of the at least two fan rays is aligned such that it intersects the optical axis at a certain point.

31. An apparatus according to claim 27, further comprising a second device which comprises a measuring device, a working device, or an operating device, wherein said second device interacts with an object of any type at a predefined target location which is set by means of the sighting device, and wherein said second device is used with or without contacting the object.

* * * * *